(12) United States Patent
Kakimi et al.

(10) Patent No.: US 12,044,303 B2
(45) Date of Patent: Jul. 23, 2024

(54) APPARATUS AND PLATE

(71) Applicants: JATCO Ltd, Fuji (JP); NISSAN MOTOR CO., LTD., Yokohama (JP)

(72) Inventors: Akira Kakimi, Fuji (JP); Tomoo Ikeda, Fuji (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 18/042,340

(22) PCT Filed: Oct. 25, 2021

(86) PCT No.: PCT/JP2021/039237
§ 371 (c)(1),
(2) Date: Feb. 21, 2023

(87) PCT Pub. No.: WO2022/097516
PCT Pub. Date: May 12, 2022

(65) Prior Publication Data
US 2023/0323940 A1    Oct. 12, 2023

(30) Foreign Application Priority Data
Nov. 6, 2020    (JP) .................................. 2020-185573

(51) Int. Cl.
*F16H 57/04* (2010.01)

(52) U.S. Cl.
CPC ..... *F16H 57/0424* (2013.01); *F16H 57/0417* (2013.01); *F16H 57/0435* (2013.01); *F16H 57/0489* (2013.01)

(58) Field of Classification Search
CPC ............ F16H 57/0417; F16H 57/0489; F16H 57/0424
USPC ............................................ 474/43; 184/6.12
See application file for complete search history.

(56) References Cited

U.S. PATENT DOCUMENTS

| | | | | |
|---|---|---|---|---|
| 4,545,334 A | * | 10/1985 | Nakagawa | F01P 11/08 123/196 AB |
| 5,678,461 A | * | 10/1997 | Stine | F16H 57/0413 74/606 R |
| 6,427,640 B1 | * | 8/2002 | Hickey | F16H 57/0412 123/41.31 |
| 8,439,020 B1 | * | 5/2013 | Carlson | F02B 39/04 123/559.3 |
| 10,427,518 B2 | * | 10/2019 | Komiya | B60K 15/067 |
| 2004/0063526 A1 | * | 4/2004 | Nobu | F16H 61/66272 474/18 |
| 2005/0072385 A1 | * | 4/2005 | Kanno | F01P 7/165 123/41.1 |
| 2006/0060346 A1 | * | 3/2006 | Sasaki | F16H 57/0415 165/202 |

(Continued)

FOREIGN PATENT DOCUMENTS

| | | |
|---|---|---|
| JP | 2004-124962 A | 4/2004 |
| JP | 2006-325367 A | 11/2006 |

*Primary Examiner* — Henry Y Liu
(74) *Attorney, Agent, or Firm* — Foley & Lardner LLP

(57) ABSTRACT

An apparatus includes a heat exchanger, a power transmission mechanism, a lubricating oil passage that is located downstream of the heat exchanger and guides lubricating oil to the power transmission mechanism, and a drain oil passage that is located downstream of the heat exchanger and drains the lubricating oil.

9 Claims, 5 Drawing Sheets

(56) References Cited

U.S. PATENT DOCUMENTS

| | | | |
|---|---|---|---|
| 2014/0352636 A1* | 12/2014 | Glassford | F01P 7/165 |
| | | | 123/41.08 |
| 2017/0097086 A1* | 4/2017 | Ono | B60K 6/405 |
| 2017/0225561 A1* | 8/2017 | Komiya | F02M 37/00 |
| 2019/0229582 A1* | 7/2019 | Ito | B60K 1/00 |
| 2020/0240510 A1* | 7/2020 | Fukawa | F16H 57/0417 |

* cited by examiner

APPARATUS AND PLATE

TECHNICAL FIELD

The present invention relates to an apparatus and a plate.

BACKGROUND ART

Patent Document 1 discloses an apparatus (belt continuously variable transmission) including an oil pressure circuit that supplies oil supplied from an oil pump to a cooler via a regulator valve and an oil passage and supplies the oil cooled by the cooler to each portion to be lubricated.

PRIOR ART DOCUMENT

Patent Document

Patent Document 1: JP 2004-124962A

SUMMARY OF INVENTION

In the above-described apparatus, when the oil supplied to the cooler is increased in order to improve the cooling efficiency (heat exchange efficiency) of the entire apparatus, there is a concern that the oil is excessively supplied to portions to be lubricated, and the operation resistance of the portions to be lubricated increases.

The present invention has been made in view of such technical problem and has an object to achieve both improvement in cooling efficiency (heat exchange efficiency) of the entire apparatus and suppression of the amount of lubricating oil supplied to the lubricating oil passage downstream of the heat exchanger.

Solutions to the Problems

According to one aspect of the present invention, an apparatus includes a heat exchanger, a power transmission mechanism, a lubricating oil passage that is located downstream of the heat exchanger and guides lubricating oil to the power transmission mechanism, and a drain oil passage that is located downstream of the heat exchanger and drains the lubricating oil.

According to another aspect of the present invention, a plate includes a lubricating oil passage that connects to a downstream side of a heat exchanger, and a drain oil passage that connects to a downstream side of the heat exchanger.

In these aspects, since a drain oil passage is provided downstream of the heat exchanger, a part of the lubricating oil flowing out of the heat exchanger can be discharged from the drain oil passage. As a result, even if the amount of the oil supplied to the heat exchanger is increased in order to improve the cooling efficiency (heat exchange efficiency) of the entire apparatus, the amount of the lubricating oil supplied to the lubricating oil passage can be suppressed.

DESCRIPTION OF EMBODIMENTS

Hereinafter, a vehicle 100 including a belt continuously variable transmission (hereinafter referred to as "CVT") 1 as an apparatus according to an embodiment of the present invention will be described with reference to the accompanying drawings.

Figure 1:
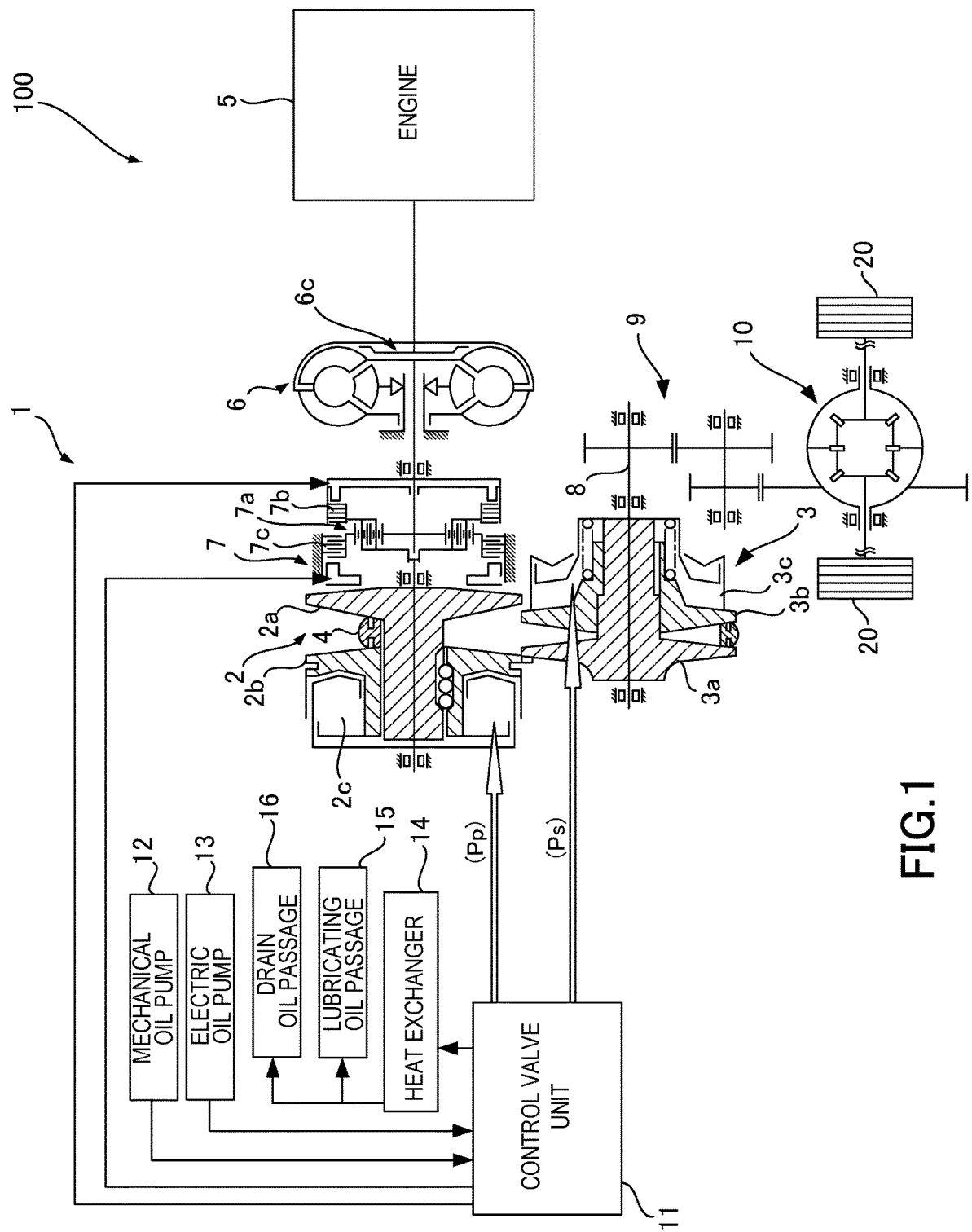
FIG. 1 is a schematic configuration diagram of a vehicle including an apparatus according to an embodiment of the present invention.

FIG. 1 is a schematic configuration diagram of a vehicle 100 including a CVT 1 according to an embodiment of the present invention. As shown in FIG. 1, the vehicle 100 includes an engine 5, a CVT 1 that shifts the rotation of the engine 5 and transmits the rotation to drive wheels 20, and a torque converter 6 provided between the engine 5 and the CVT 1. The torque converter 6 includes a lock-up clutch 6c.

The CVT 1 is an automatic transmission provided with a forward/reverse switching mechanism 7, in which a primary pulley 2 and a secondary pulley 3 as torque transmitting members are arranged such that their V-grooves are aligned, and a V-belt 4 is wound around the V-grooves of the pulleys 2 and 3. The engine 5 is arranged coaxially with the primary pulley 2, and the torque converter 6 and the forward/reverse switching mechanism 7 are provided between the engine 5 and the primary pulley 2 in this order from the engine 5 side.

The forward/reverse switching mechanism 7 includes a double-pinion planetary gear set 7a as a main component, a sun gear thereof is coupled to the engine 5 via the torque converter 6 and a carrier thereof is coupled to the primary pulley 2. The forward/reverse switching mechanism 7 further includes a forward clutch 7b that directly couples between the sun gear and the carrier of the double-pinion planetary gear set 7a, and a reverse brake 7c that fixes a ring gear. Then, during the engagement of the forward clutch 7b, an input rotation from the engine 5 through the torque converter 6 is transmitted to the primary pulley 2 as it is, and during the engagement of the reverse brake 7c, the input rotation from the engine 5 through the torque converter 6 is reversed and transmitted to the primary pulley 2.

The rotation of the primary pulley 2 is transmitted to the secondary pulley 3 via the V-belt 4, and the rotation of the secondary pulley 3 is transmitted to the drive wheels 20 via an output shaft 8, a gear set 9 and a differential gear device 10.

To enable a change of a speed ratio between the primary pulley 2 and the secondary pulley 3 during the above power transmission, one of the conical plates forming the V-groove of each of the primary pulley 2 and the secondary pulley 3 is a fixed conical plate 2a, 3a, and the other is a movable conical plate 2b, 3b displaceable in an axial direction.

These movable conical plates 2b, 3b are biased toward the fixed conical plates 2a, 3a by supplying a primary pulley pressure Pp and a secondary pulley pressure Ps produced from line pressure as a source pressure to a primary pulley chamber 2c and a secondary pulley chamber 3c, whereby the V-belt 4 is frictionally engaged with the conical plates to transmit power between the primary pulley 2 and the secondary pulley 3.

At the time of shift, a differential pressure between the primary pulley pressure Pp and the secondary pulley pressure Ps generated in response to a target speed ratio changes widths of the V-grooves of both pulleys 2 and 3, thereby continuously changing the arc diameter of the V-belt 4 winding around pulleys 2 and 3 to achieve the target speed ratio.

A control valve unit 11 performs control in response to signals from the transmission controller (not shown) and, according to the oil pressures supplied from a mechanical oil pump 12 and an electric oil pump 13, regulates the primary pulley pressure Pp, the secondary pulley pressure Ps, and oil pressures for engaging the forward clutch 7b when the forward drive mode is selected and engaging the reverse brake 7c when the reverse drive mode is selected.

The control valve unit 11 regulates the oil pressure applied to each of the above components and supplies the oil as the lubricating oil to the power transmission mechanism such as the pulleys 2, 3, the V-belt 4, and the forward/reverse switching mechanism 7 via a heat exchanger 14.

Figure 2:
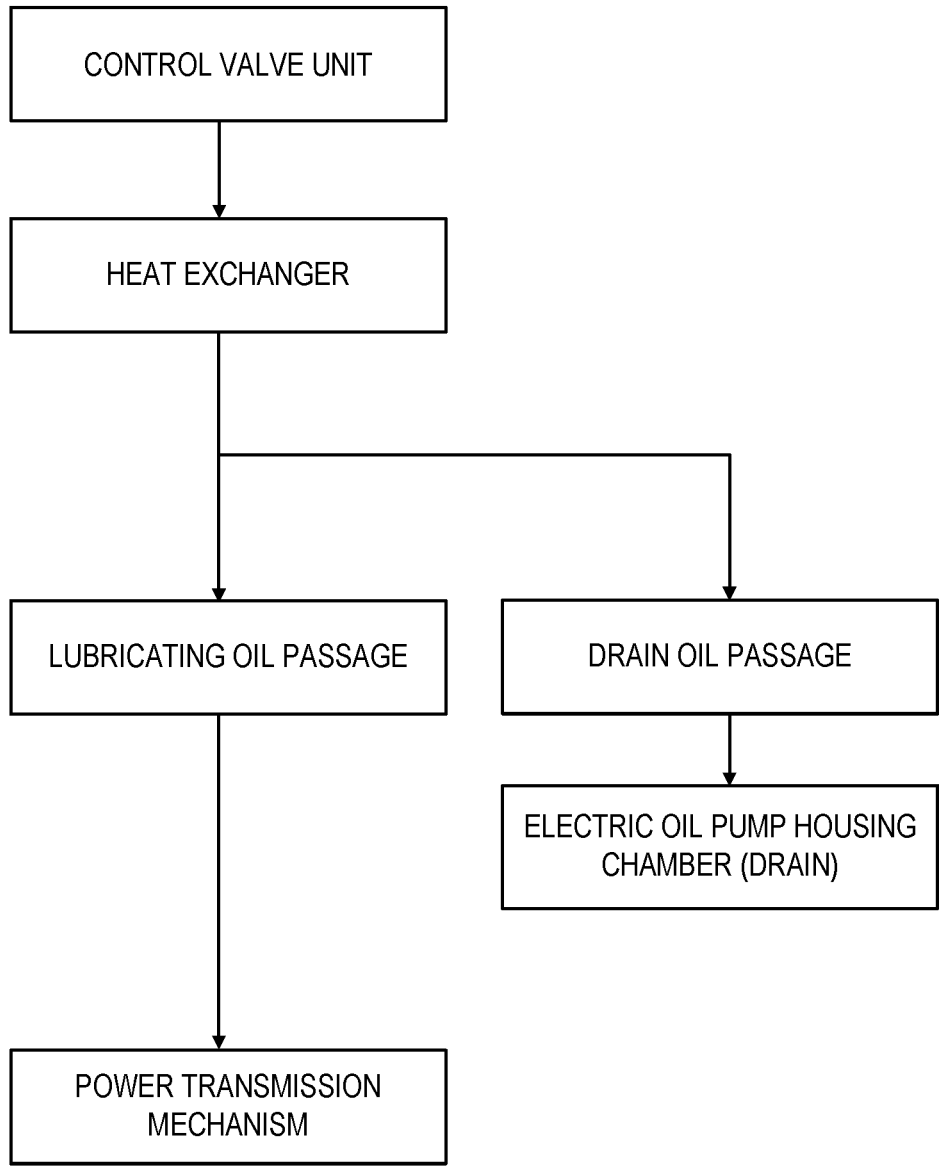
FIG. 2 is a view for describing a lubrication system of the apparatus according to the embodiment of the present invention.

FIG. 2 is a diagram for describing a lubrication system of the CVT 1, and shows a flow of the oil supplied from the control valve unit 11 to the heat exchanger 14.

The oil supplied to the heat exchanger 14 is the oil drained during a regulator valve (not shown) regulating the source pressure such as the primary pulley pressure Pp in the control valve unit 11, or the oil discharged from the torque converter 6 via a switching valve (not shown), and the oil cooled by the heat exchanger 14 flows into a lubricating oil passage 15 or a drain oil passage 16 located downstream of the heat exchanger 14.

The lubricating oil passage 15 is an oil passage for guiding the oil to components of the power transmission mechanism such as the pulleys 2, 3, the V-belt 4, and the rotary elements of the forward/reverse switching mechanism 7. The oil flowing into the lubricating oil passage 15 is guided to the components of the power transmission mechanism to cool and lubricate each component of the power transmission mechanism.

Figure 3:
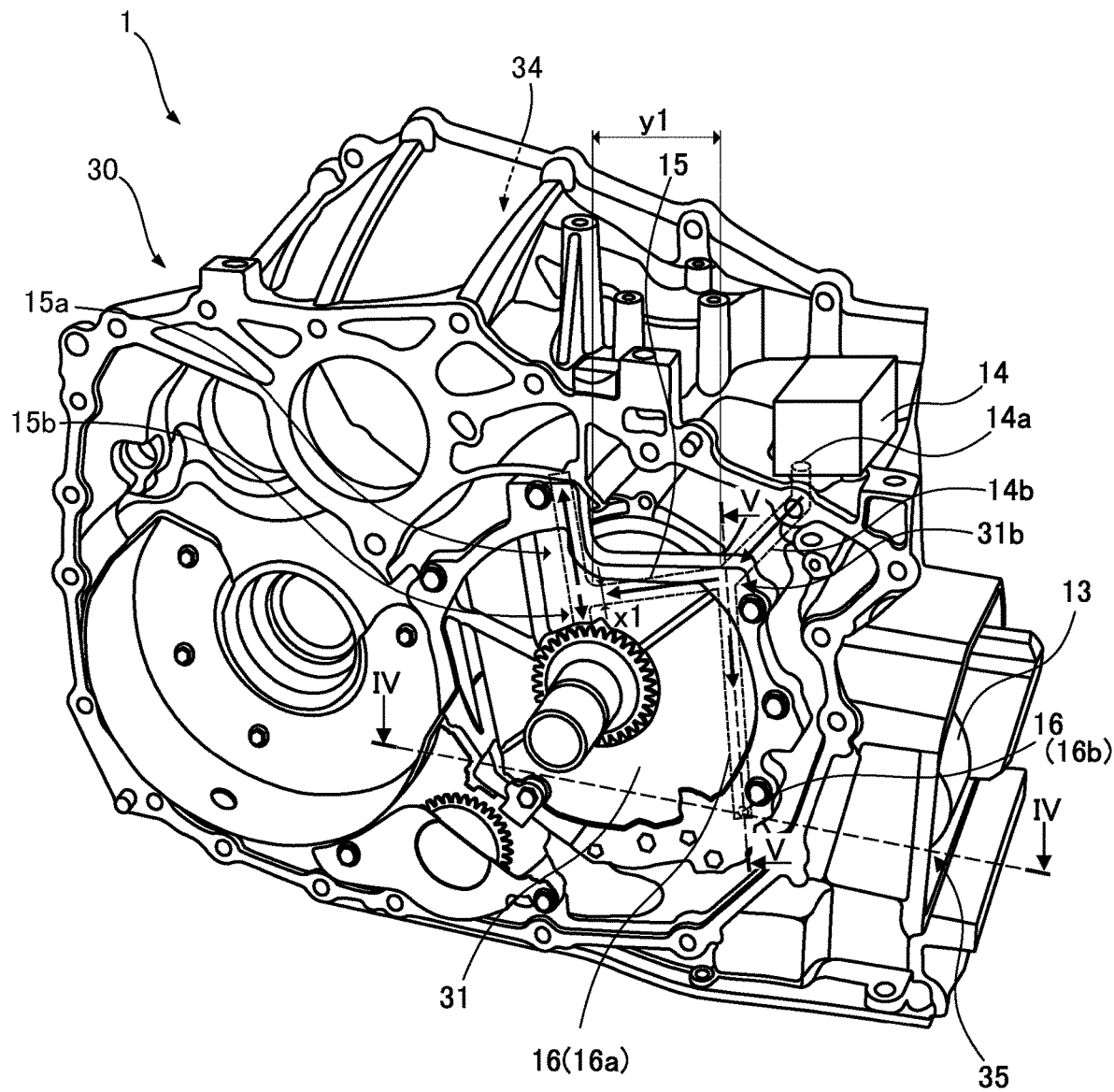
FIG. 3 is a perspective view showing a configuration of a part of the apparatus according to the embodiment of the present invention.
Figure 4:
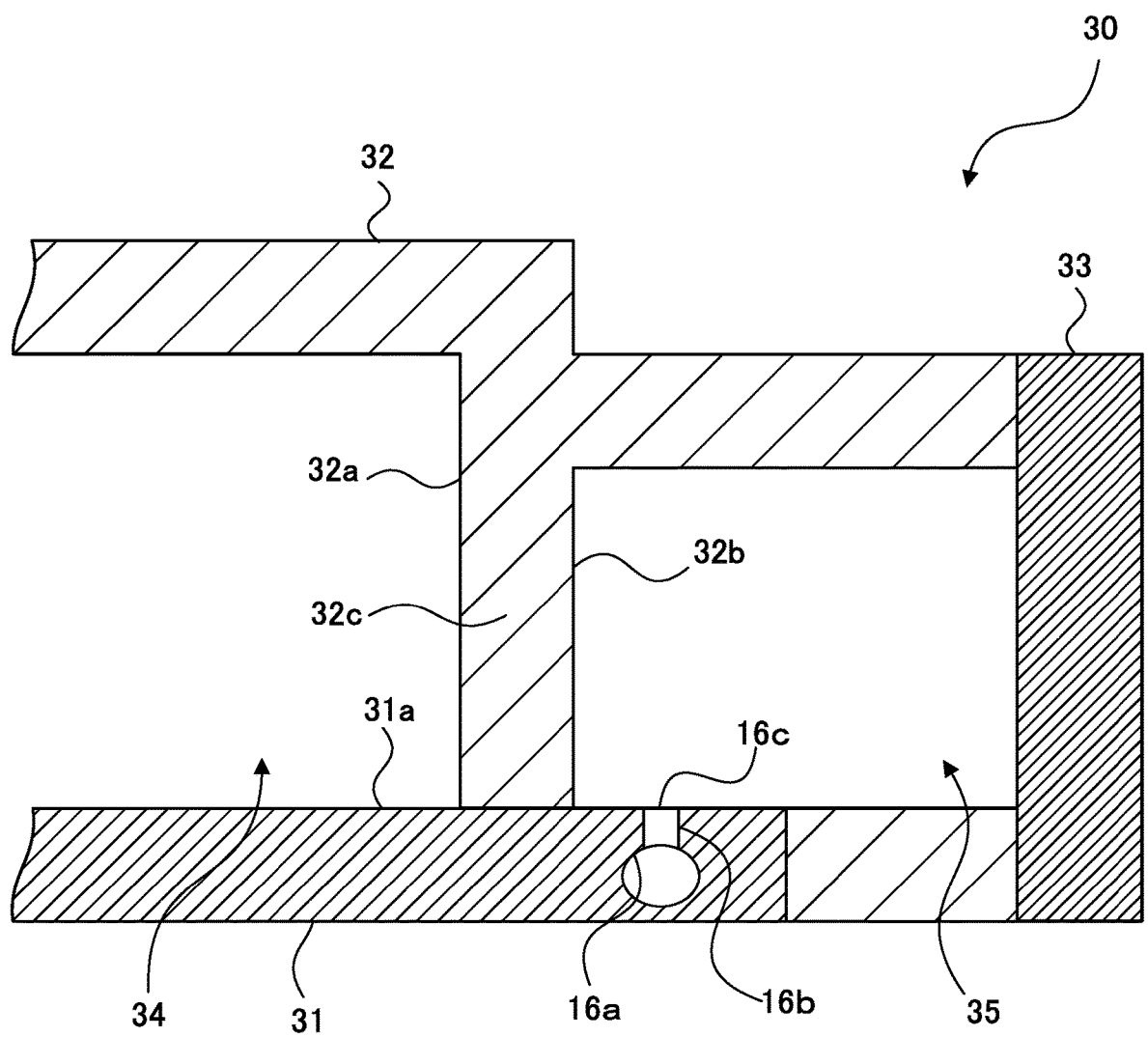
FIG. 4 is a schematic cross-sectional view taken along a line IV-IV in FIG. 3.

The drain oil passage 16 is an oil passage for guiding the oil to an electric oil pump housing chamber 35 (see FIGS. 3, 4). The oil flowing into the drain oil passage 16 is drained to the electric oil pump housing chamber 35.

This will be described in more detail below. Depending on the amount of the oil supplied from the lubricating oil passage 15 to the power transmission mechanism, the oil may become operation resistance and hinder driving of the power transmission mechanism, leading to a deterioration in fuel consumption of the vehicle 100.

Therefore, in the present embodiment, the drain oil passage 16 for discharging the oil as described above is provided downstream of the heat exchanger 14 for the purpose of suppressing the amount of the oil supplied to the lubricating oil passage 15.

The structures of the lubricating oil passage 15 and the drain oil passage 16 will be described with reference to FIGS. 3 to 5.

FIG. 3 is a perspective view showing a configuration of a part of the CVT 1. FIG. 4 is a schematic cross-sectional view taken along the line IV-IV in FIG. 3. Note that, in FIGS. 3, 4, portions not related to the description are partially omitted. FIG. 5 is a schematic cross-sectional view of the cover 31 as a plate of the CVT 1 taken along the line V-V in FIG. 3.

First, before describing the structures of the lubricating oil passage 15 and the drain oil passage 16, the structures related to portions where the lubricating oil passage 15 and the drain oil passage 16 are formed are described.

As shown in FIGS. 3 and 4, the CVT 1 includes a case 30 in which a plurality of housing chambers are defined. Each housing chamber of the case 30 houses the components of the CVT 1 described above. As shown in FIG. 3, the heat exchanger 14 is fixed to the case 30. An outlet 14a of the heat exchanger 14 connects to a flow path 14b formed in the case 30.

As shown in FIG. 4, the case 30 includes a cover 31, a first member 32 having a wall 32c including a first face 32a and a second face 32b as a back face of the first face 32a, and a second member 33. Note that the second member 33 is not shown in FIG. 3. A power transmission mechanism housing chamber 34 houses the pulleys 2, 3 and the V-belt 4 of the power transmission mechanism (not shown). That is, it can be said that the power transmission mechanism is provided on the first face 32a side.

As shown in FIG. 3, the electric oil pump housing chamber 35 houses the electric oil pump 13. The electric oil pump housing chamber 35 connects to an oil reservoir (not shown) formed by an oil pan. As shown in FIG. 4, the second member 33 is provided as a lid that closes the opening of the electric oil pump housing chamber 35.

Figure 5:
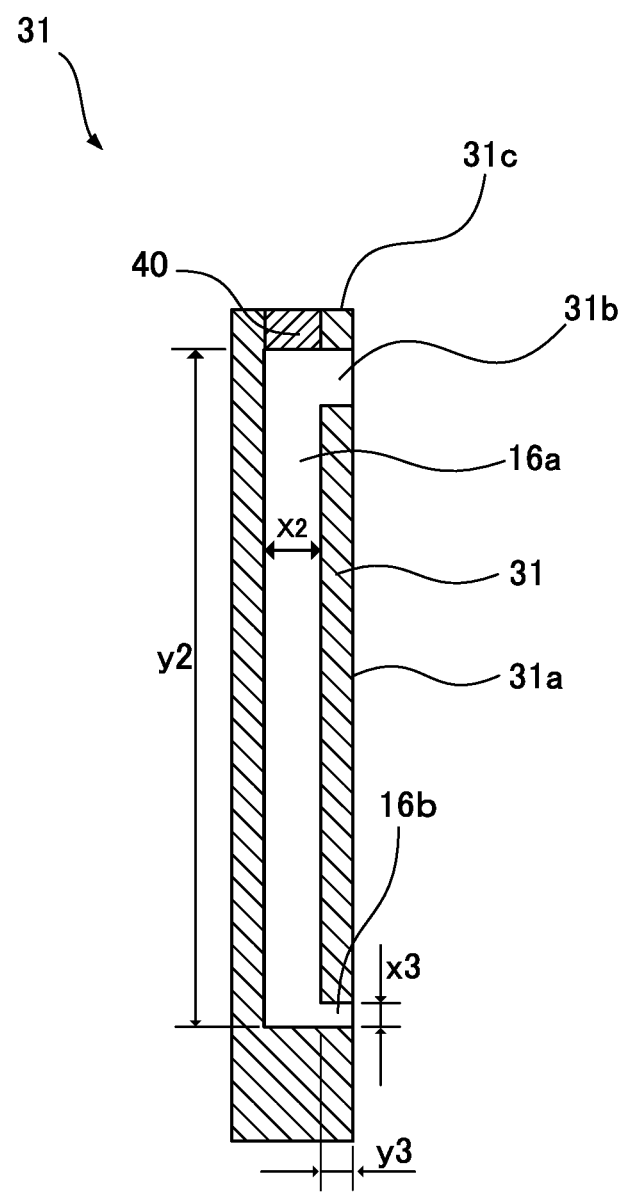
FIG. 5 is a schematic cross-sectional view of a cover taken along a line V-V in FIG. 3.

As shown in FIGS. 3 and 5, the cover 31 has an oil inlet 31b. As shown in FIG. 5, one end of the oil inlet 31b is open to a surface 31a of the cover 31. As shown in FIG. 3, the oil inlet 31b connects to the flow path 14b. As a result, the oil flowing out of the heat exchanger 14 flows into the cover 31 via the flow path 14b and the oil inlet 31b.

As shown in FIG. 3, the lubricating oil passage 15 is formed inside the cover 31, and one end thereof connects to the oil inlet 31b. The diameter x1 and the length y1 of the lubricating oil passage 15 are appropriately set so as to appropriately guide the oil to the power transmission mechanism. As shown in FIG. 3, in the present embodiment, the other end of the lubricating oil passage 15 connects to a first guide oil passage 15a for guiding the oil to the pulleys 2, 3 and the V-belt 4 housed in the power transmission mechanism housing chamber 34, and a second guide oil passage 15b for guiding the oil to the forward/reverse switching mechanism 7.

As shown in FIG. 3, the drain oil passage 16 is formed inside the cover 31, one end thereof connects to the oil inlet 31b, and the other end thereof extends in a direction toward the electric oil pump housing chamber 35. That is, it can be said that the lubricating oil passage 15 and the drain oil passage 16 are branched from the oil inlet 31b.

As shown in FIGS. 3 to 5, the drain oil passage 16 includes a main portion 16a and a throttle portion 16b having a smaller diameter x3 than the diameter x2 of the main portion 16a.

As shown in FIGS. 3 and 4, the main portion 16a extends straight to a portion of the cover 31 that defines the electric oil pump housing chamber 35 (portion of the cover 31 that faces the electric oil pump housing chamber 35).

As shown in FIGS. 4 and 5, the throttle portion 16b has one end 16c opening to the surface 31a of the cover 31, and the other end connects to the main portion 16a. In other words, the one end 16c of the throttle portion 16b (i.e., drain oil passage 16) connects to the electric oil pump housing chamber 35.

The diameter x3 and length y3 of the throttle portion 16b are appropriately set to be smaller than the diameter x2 of the main portion 16a and to be shorter than the main portion y2 of the length 16a within a range in which the amount of the oil supplied to the lubricating oil passage 15 is appropriately suppressed. In other words, it is possible to adjust the amount of the oil discharged by the drain oil passage 16 by the setting of the throttle portion 16b.

As shown in FIG. 5, the main portion 16a is formed by cutting the cover 31 with a drill from an outer peripheral face 31c and then closing the opening of the outer peripheral face 31c with a sealing member 40. The throttle portion 16b is formed by cutting the cover 31 with a drill from the surface 31a toward the main portion 16a. That is, the main portion 16a and the throttle portion 16b can be formed by merely cutting the cover 31 twice, simplifying the process and formation on the cover 31. Further, when the main portion 16a and the throttle portion 16b are orthogonal to each other as in the present embodiment, the throttle portion 16b is formed by cutting the cover 31 perpendicularly to the surface 31a with a drill, so that the process and formation on the cover 31 is easier. The main portion 16a and the throttle portion 16b may not be orthogonal to each other as long as they intersect each other.

The lubricating oil passage 15 is formed in the cover 31 by drilling and cutting in the same manner as the main portion 16a described above.

The lubricating oil passage 15 and the drain oil passage 16 are formed in the cover 31 which is a single member as described above. That is, the manufacturing process can be made easier than in the case where the lubricating oil passage 15 and the drain oil passage 16 are formed in different parts of the CVT 1, respectively.

Next, with reference to FIGS. 3 to 5, a description will be given of the effect obtained by providing the CVT 1 with the lubricating oil passage 15 and the drain oil passage 16.

First, as shown in FIG. 3, the oil flowing from the control valve unit 11 into the heat exchanger 14 and cooled flows out of the outlet 14a, passes through the flow path 14b, and flows into the cover 31 from the oil inlet 31b.

As shown in FIG. 3, in the cover 31, the lubricating oil passage 15 and the drain oil passage 16 are branched from the oil inlet 31b. Therefore, the oil flowing into the cover 31 from the heat exchanger 14 flows into the lubricating oil passage 15 or the drain oil passage 16.

The oil flowing into the lubricating oil passage 15 is guided along the lubricating oil passage 15 to the power transmission mechanism. Specifically, the oil is guided along the lubricating oil passage 15 and the first guide oil passage 15a to the pulleys 2, 3 and the V-belt 4 housed in the power transmission mechanism housing chamber 34. Alternatively, the lubricating oil is guided along the lubricating oil passage 15 and the second guide oil passage 15b to the rotary elements (double-pinion planetary gear set 7a, forward clutch 7b, and reverse brake 7c) of the forward/reverse switching mechanism 7. The oil comes into contact with the components of the power transmission mechanism to lubricates the components of the power transmission mechanism while cooling them.

In the present embodiment, the amount of the oil supplied to the lubricating oil passage 15 is suppressed by providing the drain oil passage 16. That is, even if the amount of the oil supplied from the control valve unit 11 to the heat exchanger 14 increases due to operating conditions or oil temperature, the amount of the oil supplied to the power transmission mechanism is suppressed by providing the drain oil passage 16, so that the operating resistance generated in the power transmission mechanism due to contact of oil can be reduced. The oil that contacts and lubricates the power transmission mechanism eventually drops from the power transmission mechanism and returns to the oil pan.

The oil flowing into the drain oil passage 16 is discharged from the one end 16c to the electric oil pump housing chamber 35 through the main portion 16a and the throttle portion 16b. This can suppress the amount of the oil supplied to the lubricating oil passage 15.

As described above, the throttle portion 16b of the drain oil passage 16 has a smaller flow path area (diameter x3) than that of the main portion 16a. Also, the length y3 of the throttle portion 16b is shorter than the length y2 of the main portion 16a. Therefore, the throttle portion 16b has larger flow path resistance than the main portion 16a, causing the oil to have difficulty in passing through. That is, in the drain oil passage 16, the setting of the throttle portion 16b determines the flow path resistance throughout the entire drain oil passage 16.

When the drain oil passage 16 is configured to have a small flow path resistance, the oil flowing into the cover 31 is excessively discharged. On the other hand, when the flow path resistance is large, it becomes difficult for the oil to flow into the drain oil passage 16, resulting that the amount of the oil supplied to the lubricating oil passage 15 cannot be suppressed.

In contrast to these, in the above-described configuration of the present embodiment, the drain oil passage 16 adjusts (suppresses) the flow rate of the oil to be discharged by adjusting the flow path resistance through the throttle portion 16b, which is the part where the oil is led out. This prevents the oil flowing into the cover 31 from being discharged excessively from the drain oil passage 16, and suppresses the amount of the oil supplied to the lubricating oil passage 15.

Also, when the length y3 of the throttle portion 16b is too long, the flow path resistance of the entire drain oil passage 16 becomes large and it becomes difficult for the oil to flow into the drain oil passage 16, resulting that the amount of the oil supplied to the lubricating oil passage 15 is not suppressed. On the other hand, in the present embodiment, it is possible to suppress the flow path resistance of the drain oil passage 16 by making the length y3 of the throttle portion 16b shorter than the length y2 of the main portion 16a. In this way, it is possible to adjust the flow rate of the oil to be discharged and to suppress the amount of the oil supplied to the lubricating oil passage 15.

In addition, by configuring the drain oil passage 16 to include the throttle portion 16b, that is, by configuring the flow path area (diameter x3) of the throttle portion 16b to be smaller than the flow path area (diameter x1) of the lubricating oil passage 15 and the flow path area (diameter x2) of the main portion 16a, it is possible to suppress excessive discharge of the oil without providing a new member for adjusting the discharge amount of the oil.

The oil passing through the throttle portion 16b is discharged from the one end 16c of the throttle portion 16b to the electric oil pump housing chamber 35 (see FIG. 4). Since the electric oil pump 13 housed in the electric oil pump housing chamber 35 is configured with no exposed rotary elements, the oil discharged to the electric oil pump housing chamber 35 returns to the oil pan without coming into contact with the rotary elements. That is, the oil discharged to the electric oil pump housing chamber 35 does not come into contact with the rotary elements and the air content rate thereof does not increase. In this way, the oil is discharged from the drain oil passage 16 to the electric oil pump housing chamber 35 (on the second face 32b side) where the rotary elements are not exposed, so that it is possible to prevent the air content rate of the oil from increasing due to contact with the rotary elements. By preventing the air content rate of the oil from increasing, it is possible to suppress a decrease in the discharge amount of the oil pumps 12,13 and a decrease in the heat exchange efficiency of the heat exchanger 14 due to the increase in the air content rate of the oil. In addition, since the oil is discharged to the electric oil pump housing chamber 35 which is a place where there is no possibility of contact between the oil drained from the drain oil passage 16 and the rotary elements, it is possible to prevent occurrence of operation resistance due to contact between the oil and the rotary elements.

Further, in the present embodiment, even if the amount of the oil supplied from the oil pumps 12, 13 to the heat exchanger 14 via the control valve unit 11 increases due to the operating conditions or the oil temperature, the amount of the oil supplied to the lubricating oil passage 15 can be suppressed by providing the drain oil passage 16. Therefore, it is possible to increase the amount of the oil supplied to the heat exchanger 14 to improve the oil cooling efficiency of the heat exchanger 14, while suppressing the amount of the oil supplied to the lubricating oil passage 15. This allows the power transmission mechanism to be further cooled by supplying the oil, which has been further cooled by the improved cooling efficiency, to the power transmission mechanism, thereby improving the overall cooling efficiency (heat exchange efficiency) in the CVT 1. That is, it is possible to both suppress the amount of the oil supplied to the lubricating oil passage 15 and improve the overall cooling efficiency (heat exchange efficiency) in the CVT 1.

Hereinafter, the configuration and effects of the CVT 1 or the cover 31 of the present embodiment will be collectively described.

(1) The CVT 1 includes the heat exchanger 14, the pulleys 2, 3, the V-belt 4, the forward/reverse switching mechanism 7 (double-pinion planetary gear set 7a, forward clutch 7b, and reverse brake 7c), the lubricating oil passage 15 located downstream of the heat exchanger 14 and guiding the lubricating oil to the pulleys 2, 3, the V-belt 4, and the forward/reverse switching mechanism 7, and the drain oil passage 16 located downstream of the heat exchanger 14 and draining the lubricating oil.

(8) The cover 31 includes the lubricating oil passage 15 connected to the downstream of the heat exchanger 14 and the drain oil passage 16 connected to the downstream of the heat exchanger 14.

By providing the drain oil channel 16, it is possible to flow the oil flowing out of the heat exchanger 14 into the drain oil passage 16, thereby suppressing the amount of the oil supplied to the lubricating oil passage 15.

In addition, since the amount of the oil supplied to the pulleys 2, 3, the V-belt 4, and the forward/reverse switching mechanism 7 is suppressed by providing the drain oil passage 16, it is possible to reduce the operation resistance generated in the pulleys 2, 3, the V-belt 4, and the forward/reverse switching mechanism 7 due to contact with oil. Therefore, even if the amount of the oil supplied from the oil pumps 12, 13 to the heat exchanger 14 via the control valve unit 11 increases due to operating conditions or oil temperature, it is possible to both suppress the amount of the oil supplied to the lubricating oil passage 15 and improve the overall cooling efficiency (heat exchange efficiency) in the CVT 1. It is easy to form the drain oil passage by branching out and providing the drain oil passage 16 in the middle of the lubricating oil passage 15.

(2) The CVT 1 includes the first member 32 having the wall 32c including the first face 32a and the second face 32b, wherein the pulleys 2, 3 and the V-belt 4 are provided in the power transmission mechanism housing chamber 34 on the first face 32a side, and the drain oil passage 16 drains the oil to the electric oil pump housing chamber 35 on the second face 32b side.

By draining the oil to the electric oil pump housing chamber 35 on the second face 32b side where the rotary elements are not exposed, it is possible to prevent contact between the rotary elements and the oil. As a result, it is possible to prevent the occurrence of operation resistance and an increase in the air content rate of the oil due to contact between the oil and the rotary elements. In addition, by preventing the air content rate of the oil from increasing, it is possible to suppress a decrease in the discharge amount of the oil pumps 12,13 and a decrease in the heat exchange efficiency of the heat exchanger 14.

(3) (9) The drain oil passage 16 includes the main portion 16a and the throttle portion 16b having a smaller flow path area than that of the main portion 16a.

As a result, it is possible to suppress excessive discharge of the oil without providing a new member for adjusting the discharge amount of the oil.

(4) (10) The length y3 of the throttle portion 16b is shorter than the length y2 of the main portion 16a.

As a result, it is possible to suppress the flow path resistance of the drain oil passage 16 by shortening the throttle portion 16b that determines the flow path resistance of the drain oil passage 16.

(5) The lubricating oil passage 15 and the drain oil passage 16 are formed in the cover 31.

Therefore, the manufacturing process can be made easier than in the case where the lubricating oil passage 15 and the drain oil passage 16 are formed in different parts of the CVT 1, respectively.

(6) (11) The one end 16c of the throttle portion 16b opens to the surface 31a of the cover 31.

(7) (12) The main portion 16a and the throttle portion 16b intersect with each other.

These simplify the process and formation of the drain oil passage 16 on the cover 31.

While an embodiment of the invention has been described, the embodiment is merely one of application examples of the invention, and does not intend to limit a technical scope of the invention to a specific configuration according to the embodiment.

For example, the above embodiment describes a case where the apparatus is a CVT 1. However, the apparatus may be any apparatus that contributes to power transmission. For example, it may be an apparatus having a transmission, a reduction gear, or others.

In addition, the present embodiment describes an aspect in which the cross-section of the lubricating oil passage 15 is circular with a diameter of x1. Similarly, an aspect in which the cross-section of the main portion 16a of the drain oil passage 16 is circular with a diameter of x2 and an aspect in which the cross-section of the throttle portion 16b is circular with a diameter of x3 are described. However, the cross-sectional shapes of the lubricating oil passage 15, the main portion 16a, and the throttle portion 16b are not limited to those described above as long as the flow path area of the throttle portion 16b is smaller than the flow path area of the lubricating oil passage 15 and the flow path area of the main portion 16a.

Further, in the present embodiment, the lubricating oil passage 15, and the main portion 16a and the throttle portion 16b of the drain oil passage 16 are described as straight flow paths formed by cutting with a drill, but the flow path shapes of the lubricating oil passage 15, and the main portion 16a and the throttle portion 16b of the drain oil passage 16 are not limited to the above.

The present application claims a priority of Japanese Patent Application No. 2020-185573 filed with the Japan Patent Office on Nov. 6, 2020, all the contents of which are hereby incorporated by reference.

DESCRIPTION OF REFERENCE SIGNS 2, 3 Pulley (power transmission mechanism)
4 V-belt (power transmission mechanism)
7 Forward/reverse switching mechanism (power transmission mechanism)
7a Double-pinion planetary gear set (power transmission mechanism)
7b Forward clutch (power transmission mechanism)
7c Reverse brake (power transmission mechanism)
14 Heat exchanger
15 Lubricating oil passage
16 Drain oil passage
16a Main portion
16b Throttle portion
31 Cover (plate)
31a Surface
32a First face
32b Second face
32c Wall

The invention claimed is:

1. An apparatus comprising:
a heat exchanger;
a power transmission mechanism configured to transmit power between a drive source and drive wheels;
a lubricating oil passage that is located downstream of the heat exchanger and guides lubricating oil to the power transmission mechanism;
a drain oil passage that drains the lubricating oil between the heat exchanger and the power transmission mechanism; and
a wall that has a first face and a second face as a back face of the first face, wherein
the power transmission mechanism is provided on the first face side of the wall,
a member configured with no exposed rotary elements is provided on the second face side of the wall, and
the drain oil passage drains the lubricating oil to the second face side of the wall.

2. The apparatus according to claim 1, wherein
the drain oil passage includes a main portion and a throttle portion having a smaller flow path area than that of the main portion.

3. The apparatus according to claim 2, wherein
a length of the throttle portion is shorter than the length of the main portion.

4. The apparatus according to claim 2, wherein
the lubricating oil passage and the drain oil passage are formed in a plate.

5. The apparatus according to claim 4, wherein
one end of the throttle portion opens to a surface of the plate.

6. The apparatus according to claim 2, wherein
the main portion and the throttle portion intersect with each other.

7. A plate comprising:
a lubricating oil passage that connects to a downstream side of a heat exchanger; and
a drain oil passage that connects to a downstream side of the heat exchanger,
wherein the drain oil passage includes a main portion and a throttle portion having a smaller flow path area than that of the main portion, and
wherein one end of the throttle portion opens to a surface of the plate.

8. The plate according to claim 7, wherein
a length of the throttle portion is shorter than a length of the main portion.

9. The plate according to claim 7, wherein
the main portion and the throttle portion intersect with each other.

* * * * *